Aug. 31, 1948.  J. R. MULHOLLAND  2,448,150
RING AND TRAVELER FOR TWISTER FRAMES
Filed June 27, 1947
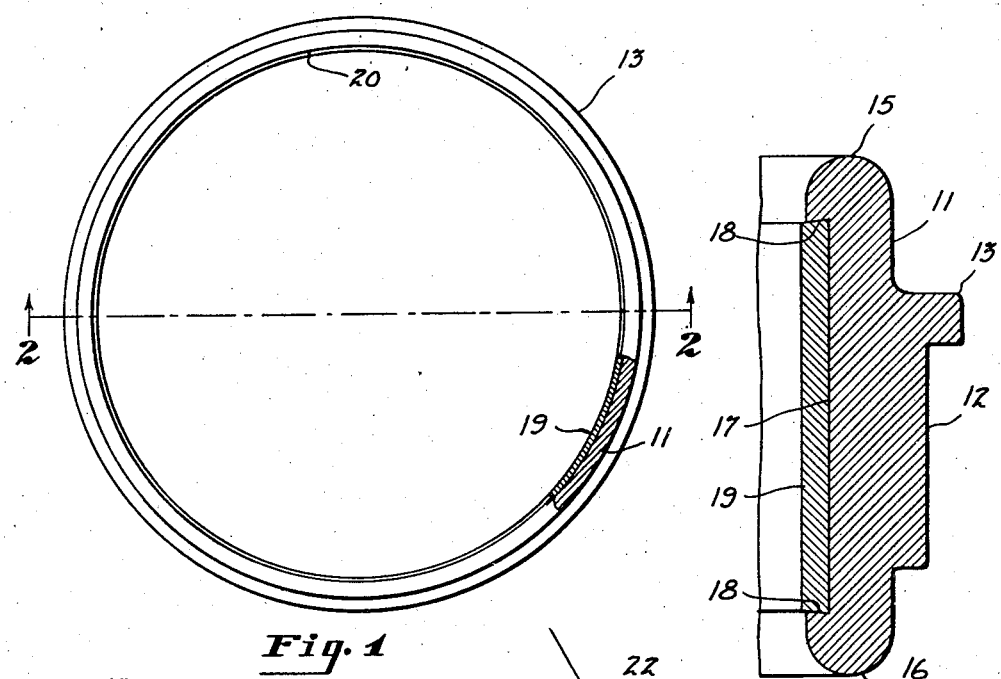
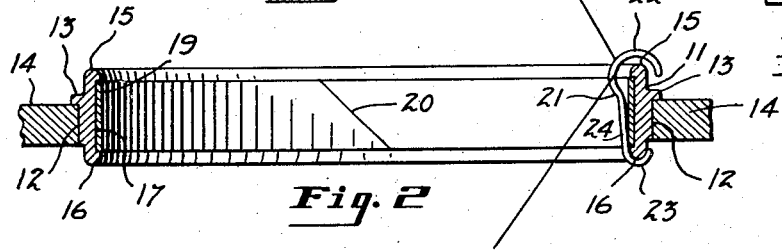
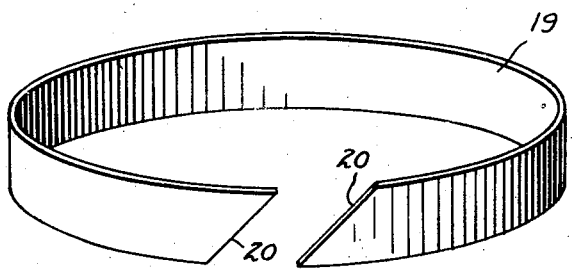
INVENTOR.
James R. Mulholland
BY
Evans + McCoy
ATTORNEYS Patented Aug. 31, 1948

2,448,150

UNITED STATES PATENT OFFICE 2,448,150

RING AND TRAVELER FOR TWISTER FRAMES

James R. Mulholland, University Heights, Ohio

Application June 27, 1947, Serial No. 757,418

5 Claims. (Cl. 57—119)

1

This invention relates to rings and travelers for twister frames, and has for its object to increase the production of such frames by reducing the breakage of the cord being twisted.

Twister frames have heretofore been provided with hardened steel rings upon which travelers of spring bronze are slidably mounted. Frequent breakage of the cord being twisted is caused by the abrasive action of worn travelers on the cords and by the dislodgment of worn travelers from the ring.

In my copending application, Serial No. 686,563, filed July 26, 1946, now abandoned, I have disclosed a ring and traveler in which the traveler is formed of steel and runs upon a ring that is provided with a bearing metal liner.

The present invention is an improvement upon the invention disclosed in the aforesaid application in which the steel traveler bears upon an insert formed of a bearing metal that is rigidly mounted in the interior face of a steel ring.

With the above and other objects in view, the invention may be said to comprise the ring and traveler as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a top plan view showing a ring and traveler embodying the invention;

Fig. 2 is a transverse section taken on the line indicated at 2—2 in Fig. 1;

Fig. 3 is a fragmentary view showing a radial section through one side of the ring, the section corresponding to that shown in Fig. 2 but on a larger scale; and Fig. 4 is a perspective view of the bearing ring.

Referring to the accompanying drawings, the traveler ring 11 of the present invention is a hardened steel ring provided with a cylindrical external portion 12 and a short peripheral flange 13 above the cylindrical portion 12. The cylindrical external portion 12 of the ring 11 fits within a circular opening in a twister rail 14 with the flange 13 bearing against the top surface of the rail. The steel ring 11 has rounded top and bottom edges 15 and 16 and upon the interior face thereof there is provided a circumferential channel 17 that occupies the major portion of the width of the interior face of the ring. The channel 17 has sides 18, which as shown in Fig. 3

2 are undercut at a slight angle. The channel 17 receives an annular insert 19 in the form of a transversely split ring composed of a resilient bearing metal such as a nickel copper alloy, in which the nickel content exceeds that of copper, or a spring bronze such as phosphor bronze. The hardness of the bearing ring is preferably about 165 to 185 Brinell. The annular insert 19 is formed from a strip of sheet metal of a width to fit tightly within the channel 17 and the body 11, and of a length corresponding to the circumference of the channel.

The flat band forming the annulus 19 is rolled to a diameter slightly greater than that of the channel in which the ring is to be mounted, and the ring is pressed into the channel under pressure sufficient to cause the edges of the strip to conform to the undercut sides 18 of the channel. The annular insert 19 has bias cut ends 20 which abut when the ring is placed in the channel 17 so that the insert 19 provides a continuous cylindrical bearing surface. The thickness of the insert 19 is preferably slightly greater than the depth of the channel 17 so that the internal face of the insert after it is mounted in the channel is of a diameter slightly less than that of the internal face of the body 11 of the ring.

A traveler 21 of hardened steel is mounted upon the ring 11 and is provided with a wide cord receiving hook 22 at its upper end which extends over the top edge 15 of the ring 11, and with a hook 23 at its lower end which extends over the lower edge 16 of the ring. The traveler 21 has an intermediate bearing portion 24 that bears against the interior face of the insert 19 during operation of the twister frame, during which the traveler slides around the ring.

The hardness of the spring metal bearing insert is considerably less than the hardness of the steel body 11 of the ring, and the hardness of the steel traveler 21 is preferably slightly less than the hardness of the steel body 11 and considerably greater than the hardness of the bearing insert 19.

By reason of the tight fit of the insert 19 in the channel 17, the insert is rigidly held against axial and circumferential movements during operation.

A hardened steel traveler has the advantage that it will operate for a long period of time before there is appreciable wear on the surface engaged by the cord which slides through the traveler during the operation of the machine. Because of its greater wear resistance the breakage of the cord due to the abrasive action of the traveler is much less frequent. Also the wear on the travelers due to frictional engagement with the ring is much less and the steel travelers have a much longer life.

It is to be understood that variations and modifications of the specific devices herein shown and described for purposes of illustration, may be made without departing from the spirit of the invention.

What I claim is:

1. A ring and traveler for twister frames comprising a hardened steel ring provided with rounded top and bottom edges and a continuous circumferential channel in its interior face, an annular insert formed of a resilient bearing metal softer than the steel of said ring and fitting in said channel, said insert having an internal substantially cylindrical surface and a steel traveler having end portions hooked over the top and bottom edges of said ring and an intermediate portion that slidably engages the cylindrical internal face of said bearing metal insert.

2. A ring and traveler for twister frames comprising a hardened steel ring provided with rounded top and bottom edges and a continuous circumferential channel in its interior face, an annular insert formed of a resilient bearing metal softer than the steel of said ring and fitting in said channel, said insert having a radial thickness slightly greater than the radial depth of said channel and a substantially cylindrical internal bearing surface of a slightly less diameter than the interior face of said ring, and a steel traveler having end portions hooked over the top and bottom edges of said ring and an intermediate portion that slidably engages the cylindrical internal face of said bearing metal insert.

3. A ring and traveler for twister frames comprising a hardened steel ring provided with rounded top and bottom edges and a continuous circumferential channel in its inner face that occupies the major portion of the width of said interior face, an annular insert formed of a resilient bearing metal fitting in said channel and having an internal substantially cylindrical surface of a diameter slightly less than that of the interior face of said ring, and a steel traveler of less hardness than said ring and greater hardness than said insert and having end portions that are hooked over the top and bottom edges of said ring and an intermediate portion that bears against the internal surface of said insert.

4. A traveler ring for twister frames comprising a hardened steel body having rounded top and bottom edges and a continuous circumferential channel in its interior face that occupies the major portion of the width of said interior face, and an insert in the form of a spring bronze bearing ring fitting in said channel and having a substantially cylindrical interior face of slightly less diameter than the interior face of said body.

5. A traveler ring for twister frames comprising a hardened steel body having rounded top and bottom edges and a continuous circumferential channel in its interior face, said channel occupying the major portion of the axial width of said interior face and having the sides thereof undercut at a slight angle, and an insert in the form of a transversely split ring of spring bronze that fits closely in said channel, said bearing ring having abutting bias cut ends and a substantially cylindrical interior face of a diameter slightly less than that of the inner face of said body.

JAMES R. MULHOLLAND.

REFERENCES CITED

The following references are of record in the file of this patent:

UNITED STATES PATENTS

| Number | Name | Date |
|---|---|---|
| 2,194,930 | Feen | Mar. 26, 1940 |

FOREIGN PATENTS

| Number | Country | Date |
|---|---|---|
| 3,517 | Great Britain | 1901 |
| 422,093 | Germany | Mar. 30, 1926 |
| 115,910 | Switzerland | July 16, 1926 |